(12) United States Patent
Yamamoto

(10) Patent No.: US 8,132,922 B2
(45) Date of Patent: Mar. 13, 2012

(54) FILTER UNIT AND PROJECTION-TYPE DISPLAY APPARATUS

(75) Inventor: Masaya Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 178 days.

(21) Appl. No.: 12/767,089

(22) Filed: Apr. 26, 2010

(65) Prior Publication Data

US 2010/0277701 A1 Nov. 4, 2010

(30) Foreign Application Priority Data

Apr. 30, 2009 (JP) ................................. 2009-110532

(51) Int. Cl.
*G03B 21/16* (2006.01)
(52) U.S. Cl. ..................................... 353/57; 250/231.13
(58) Field of Classification Search .................... 353/57, 353/61, 85; 250/231.13–231.18
See application file for complete search history.

(56) References Cited

U.S. PATENT DOCUMENTS

| 5,548,673 A | 8/1996 | Kitamura et al. | |
|---|---|---|---|
| 2008/0240565 A1* | 10/2008 | Kitazaki | 382/175 |
| 2009/0238588 A1* | 9/2009 | Matsuda et al. | 399/46 |

FOREIGN PATENT DOCUMENTS

| JP | 7-026938 A | 1/1995 |
|---|---|---|
| JP | 7-035948 A | 2/1995 |
| JP | 2008-309913 A | 12/2008 |

* cited by examiner

*Primary Examiner* — Seung C Sohn
(74) *Attorney, Agent, or Firm* — Hamre, Schumann, Mueller & Larson, P.C.

(57) ABSTRACT

A filter unit includes: a feeding shaft 24 around which an unused part of a roll filter 18 is wound; a take-up shaft 25 for taking up the filter from the feeding shaft; a motor 40 for rotating and driving the take-up shaft so as to take up the filter; a filter unit housing 26 for housing the feeding shaft and the take-up shaft and including, between the both shafts, an opening for exposing the filter; rotation detection patterns 42 that rotate in connection with transfer of the filter caused by taking up the filter and are placed at predetermined intervals in a circumferential direction in which the rotation detection patterns rotate; a pattern sensor 43 for detecting rotation of the rotation detection patterns and outputting a detection signal whose amplitude fluctuates in accordance with the predetermined intervals; and a used filter amount detecting unit for detecting a used amount of the filter based on a correspondence between a period at which the amplitude of the detection signal fluctuates and an amount of the filter taken up by the take-up shaft. Since the period at which the amplitude of the detection signal fluctuates corresponds to the used amount of the filter, the used amount of the filter can be detected precisely.

4 Claims, 8 Drawing Sheets

| Pulse width (msec) | Used filter amount (%) |
|---|---|
| 205 | 0 |
| 200 | 5 |
| 195 | 10 |
| 190 | 15 |
| 185 | 20 |
| 180 | 25 |
| 175 | 30 |
| 170 | 35 |
| 160 | 40 |
| 155 | 45 |
| 150 | 50 |
| 145 | 55 |
| 140 | 60 |
| 135 | 65 |
| 130 | 70 |
| 125 | 75 |
| 120 | 80 |
| 115 | 85 |
| 110 | 90 |
| 105 | 95 |
| 100 | 100 |

FIG. 6

# FILTER UNIT AND PROJECTION-TYPE DISPLAY APPARATUS

BACKGROUND OF INVENTION

1. Field of the Invention

The present invention relates to a filter unit using a detachable roll filter and a projection-type display apparatus using the filter unit.

2. Description of Related Art

Projection-type display apparatuses such as a projector have been used in a variety of circumstances, from home-theater to commercial uses. Projection-type display apparatuses include image display elements, such as a liquid crystal panel and a DMD (digital mirror device), and magnify and project an optical image formed by concentrating strong light from a light source, such as a lamp, onto the image display elements and modulating the strong light in response to an input image signal. The image display elements subjected to strong light, the light source itself the apparatus power supply, etc. may be thermally damaged unless they are cooled properly. Therefore, cooling fans for obtaining a strong cooling effect generally are used in projection-type display apparatuses so as to blow air into the apparatuses from the outside.

However, when a flow of air is produced by a cooling fan blowing in air, dust in the air enters the apparatus, so that it is necessary to remove the dust by providing the air intake with a filter. However, when the dust accumulates on the filter, the cooling effect drops. Therefore, many projection-type display apparatuses use detachable roll filters.

When a detachable roll filter is used, the cooling effect can be kept constant by taking up the filter when a predetermined amount of dust accumulates on the filter. However, since the length of the filter that can be taken up is fixed, the filter needs replacing when it is taken up entirely. To know an indication of the timing to replace the filter, it is necessary to detect the used amount or remaining amount of the filter.

For example, JP 2008-309913 A discloses a filter device configured to be capable of detecting a transferred amount of a filter when the filter is taken up. FIG. 8 is a front view showing the basic configuration of the filter device. FIG. 9 is a perspective view of a gear base of the filter device. Note that some parts are omitted and not shown in FIGS. 8 and 9.

The filter device is composed of a filter unit 60 and the gear base 61. The filter unit 60 includes a filter holder 62, an opening 63, an opening wall 64, an airflow aperture 65 and a take-up shaft side coupling unit 66. The filter unit 60 is equipped with a filter cartridge 67. The gear base 61 includes a gear motor 68, a driving shaft side coupling unit 69, magnets 70 and a magnetic sensor 71. The magnets 70 are placed at predetermined positions on the periphery side of the driving shaft side coupling unit 69. The magnetic sensor 71 detects a change in magnetic force brought by rotation of the magnets 70.

In this configuration, the rotation of the driving shaft side coupling unit 69 is detected with the magnets 70 and the magnetic sensor 71, and based on the amount of rotation corresponding to a detection signal of the magnetic sensor 70, the amount of the filter transferred when the filter being taken up is detected. By summing the transferred amounts of the filer detected with the take-up of the filter, the currently used amount of the filter is calculated.

However, there is normally a small difference between the transferred amount of the filter detected by the magnetic sensor 17 and the actual transferred amount of the filter. For example, there is some slack in the filter in the filter cartridge 67 in a rolled state. Thus, a small difference develops between the amount of rotation of the driving shaft side coupling unit 69 transmitted through the take-up shaft side coupling unit 66 and the transferred amount of the filter as the filter is taken up. Since the detection output of the magnetic sensor 71 is proportional to the amount of rotation of the driving shaft side coupling unit 69, the transferred amount of the filter detected by the magnetic sensor 71 and the actual transferred amount of the filter do not correspond with each other precisely. Such a difference is amplified when summing the transferred amounts of the filter.

Further, JP 2008-309913 A does not describe an optimum way to correlate the detection result provided by the magnetic sensor 71 and the used amount of the filter precisely.

SUMMARY OF THE INVENTION

With the foregoing in mind, it is an object of the present invention to provide a filter unit that allows detection of the used amount of a detachable roll filter with stability and high precision and a projection-type display apparatus using the filter unit.

In order to solve the above-described problems, the filter unit of the present invention includes: a feeding shaft around which an unused part of a roll filter is wound; a take-up shaft for taking up the filter from the feeding shaft; a motor for rotating and driving the take-up shaft so as to take up the filter; a filter unit housing for housing the feeding shaft and the take-up shaft and including, between the both shafts, an opening for exposing the filter; rotation detection patterns that rotate in connection with transfer of the filter caused by taking up the filter and are placed at predetermined intervals in a circumferential direction in which the rotation detection patterns rotate; a pattern sensor for detecting rotation of the rotation detection patterns and outputting a detection signal whose amplitude fluctuates in accordance with the predetermined intervals; and a used filter amount detecting unit for detecting a used amount of the filter based on a correspondence between a period at which the amplitude of the detection signal fluctuates and an amount of the filter taken up by the take-up shaft.

According to this configuration, the period at which the amplitude of the detection signal outputted by the pattern sensor fluctuates has a one-to-one correspondence with the take-up amount of the filter at the take-up shaft, in other words, with the used amount of the filter. Therefore, the used amount of the filter can be known immediately from the detection signal of the pattern sensor, allowing highly precise filter position detection irrespective of the used amount of the filter. This is because it is possible to avoid the accumulation of differences in measuring the transferred amount of the filter caused by summing the transferred amounts of the filter each being detected every time the filter is taken up.

BRIEF DESCRIPTION OF THE DRAWINGS

FIG. 6 is a table showing a relationship between a detection pulse width and a filter used amount.

DETAILED DESCRIPTION OF THE INVENTION

The filter unit of the present invention, having the basic structure as described above, can be configured as follows.

That is, the rotation detection patterns may be defined by a gear and the pattern sensor may be composed of a photosensor for detecting projections and depressions of the gear.

Further, the used filter amount detecting unit may include a table providing a correlation between the detection signal outputted by the pattern sensor and the used mount of the filter, and the used filter amount detecting unit may detect, by using data in the table, the used amount of the filter based on the detection signal outputted from the pattern sensor as the rotation detection patterns rotate.

The projection-type display apparatus of the present invention may include a light source unit; an image forming unit for forming an image by modulating light from the light source unit; a projection optical system for magnifying and projecting the formed image; a housing for housing the light source unit, the image forming unit and the projection optical system; an air intake and an exhaust provided on the housing; a blower unit for taking in or exhausting air through the air intake and the exhaust; and the filter having the configuration described above placed at the air intake.

Embodiment

Figure 1:
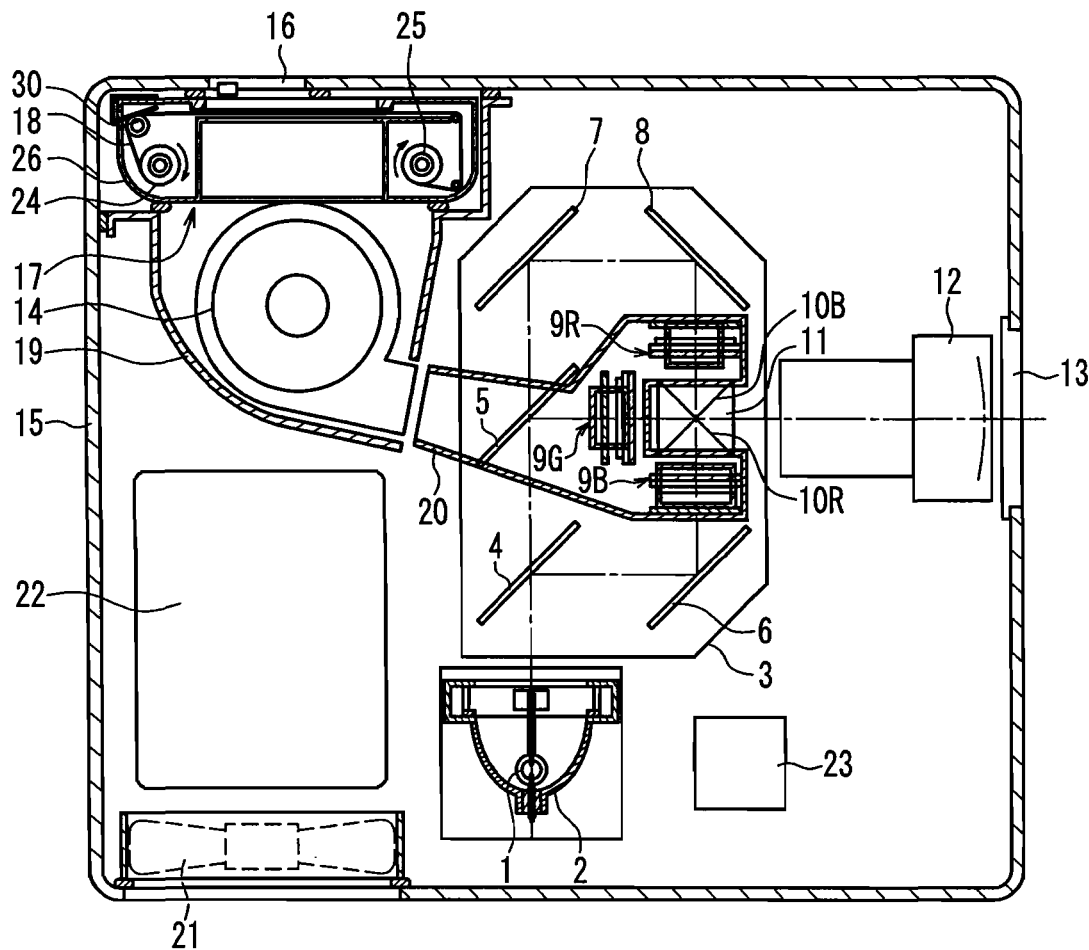
FIG. 1 is a cross-sectional view showing an overall planar configuration of a projection-type display apparatus according to an embodiment of the present invention.

Hereinafter, an embodiment of the present invention will be described with reference to the drawings. FIG. 1 is a cross-sectional view showing an overall planar configuration of a projection-type display apparatus according to the present embodiment. The present embodiment is directed to detection of the used amount or remaining amount of a filter in a filter unit used in the projection-type display apparatus. Therefore, there is no specific limitation to the configuration of the optical system. A typical optical system is shown in the present embodiment and it will be explained only briefly in the following description.

In FIG. 1, light emitted by a lamp 1 as a light source is reflected by a reflection mirror 2 frontwards, and enters an optical unit 3. The incident light is separated into red, green and blue colored light beams through dichroic mirrors 4 and 5 and total reflection mirrors 6, 7 and 8.

The intensity of the separated light beams of the respective colors is modulated by liquid crystal light bulbs 9R, 9G and 9B as image display elements based on an external input signal (not shown). These light beams are combined on an optical path by a combine prism 11 including dichroic reflection films 10R and 10B, and then the combined light beam enters a projection lens 12. The projection lens 12 is designed to magnify images of the liquid crystal light bulbs 9R, 9G and 9B and to project them on a screen (not shown) placed in front of the apparatus.

An air intake fan 14 provided adjacent to the optical unit 3 introduces outside air (air with a relatively low temperature) into the apparatus through a housing air intake 16 provided on a side surface of a housing 15. The outside air taken in by the air intake fan 14 is guided to an air intake duct 19 through a filter 18 in a filter unit 17 and is guided to an optical unit duct 20 being in intimate contact with a blowoff opening of the fan.

The optical unit duct 20 is provided with red, green and blue apertures (not shown) at the positions respectively corresponding to the bottom of the liquid crystal light bulbs 9R, 9G and 9B described above. The air issued from these apertures takes away heat from the liquid crystal light bulbs 9R, 9G and 9B and then is exhausted by an exhaust fan 21. During this process, the air to be exhausted also takes away heat from the lamp 1, mechanical components in the vicinity of the lamp 1, and a power supply unit 22.

In such a cooling process, external dust taken in together with outside air could adhere to the periphery of the liquid crystal panel and to the light source unit, and may cause problems such as early deterioration of luminance and color unevenness in projected images as a result. In order to prevent these problems, the filter unit 17 is provided to face the housing air intake 16.

A control circuit unit 23 has the function of controlling the operation of the filter unit 17 as a part of the functions of controlling the entire operation of the projection-type display apparatus. A detection output from a sensor for gathering data for controlling the operation of the filter unit 17 is inputted to the control circuit unit 23, and the control circuit unit 23 controls the filter unit 17 based on the sensor output.

Figure 2:
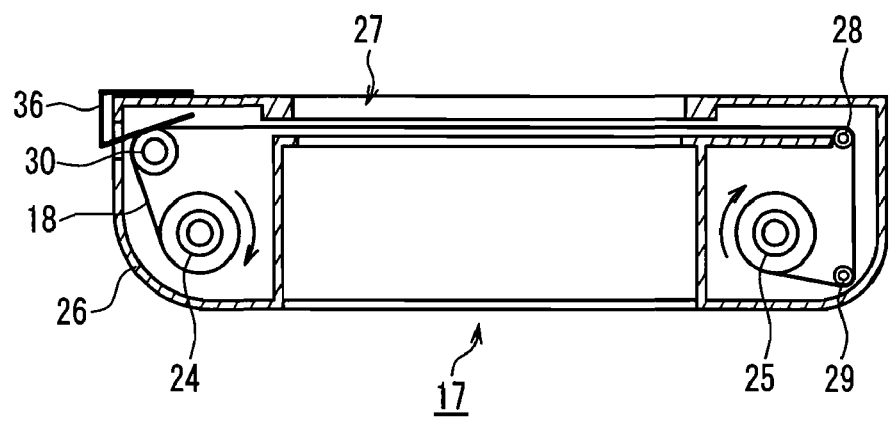
FIG. 2 is a cross-sectional view showing a structure of a filter unit of the projection-type display apparatus.

Next, the structure of the filter unit 17 will be described with reference to FIG. 2. FIG. 2 is an enlarged plan cross-sectional view showing the filter unit 17. The filter unit 17 is composed of a dust capture unit, a filter feeding mechanism and a filter speed detector.

The dust capture unit is composed of a filter feeding shaft 24, a filter take-up shaft 25 and the filter 18 stretched between the two shafts. The filter 18 is attached in a rolled state, and the unused part of the filter 18 is held by the filter feeding shaft 24. These components are housed in a small housing 26 including a coupling part to be coupled to the filter feeding mechanism.

The small housing 26 includes, between the filter feeding shaft 24 and the filter take-up shaft 25, an opening 27 having substantially the same size as the housing air intake 16 and allowing air from the housing air intake 16 to flow in. Furthermore, guide shafts 28 and 29 for guiding the filter 18 and a filter following shaft 30 are placed between the filter feeding shaft 24 and the filter take-up shaft 25.

Figure 3:
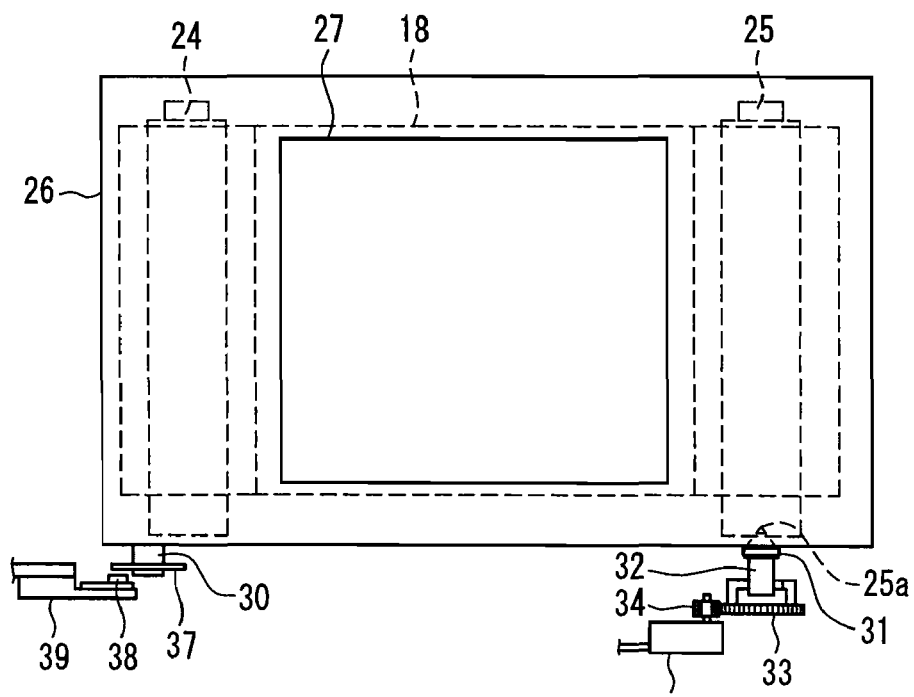
FIG. 3 is a front view showing a schematic configuration of a filter feeding mechanism of the projection-type display apparatus.

The filter feeding mechanism is composed of a driving unit including a motor, and a coupling unit for coupling the filter take-up shaft 25 to the driving unit. FIG. 3 is a plan view showing a schematic configuration of the filter feeding mechanism.

As shown in FIG. 3, an end portion of the filter take-up shaft 25 is provided with a recessed portion 25a, and a coupling portion 31 is inserted in the recessed portion 25a. Because of the coupling portion 31, the small housing 26 housing the filter 18 can be detachable from the main body of the apparatus. A gear 33 is fixed to the coupling portion 31 through a shaft 32. The gear 33 is connected to a stepping motor unit 35 through a small gear 34.

As shown in FIG. 2, the filter speed detector includes a pressure spring 36 so that the filter 18 moving on the filter following shaft 30 comes into intimate contact with the filter following shaft 30. Consequently, when the filter 18 is taken up, the filter following shaft 30 rotates in response to the transfer of the filter 18 with certainty. According to this configuration, the rotation of the filter following shaft 30 always corresponds to the transferred amount of the filter.

As shown in FIG. 3, rotation detection reflective patterns 37 are provided at the end of the filter following shaft 30 protruded from the bottom of the small housing 26. A photosensor 38 as a pattern sensor is secured to an apparatus main body wall 39 so as to face the rotation detection reflective patterns 37. The photosensor 33 is capable of optically detecting the detection reflective patterns 37 and measuring a transferred amount of the filter 18 based on the detection signal.

Basically, the rotation detection reflective patterns 37 are composed of patterns placed at predetermined intervals in the circumferential direction in which the filter following shaft 30 rotates. Therefore, an output signal of the photosensor 33 that detects the rotation detection reflective patterns 37 as the filter following shaft 30 rotates has a pulsed waveform with certain period (width) whose amplitude fluctuates in accordance with the predetermined intervals at which the rotation detection reflective patterns 37 are placed. The period of the pulsed waveform changes in accordance with the rotation speed of the filter following shaft 30.

Figure 4:
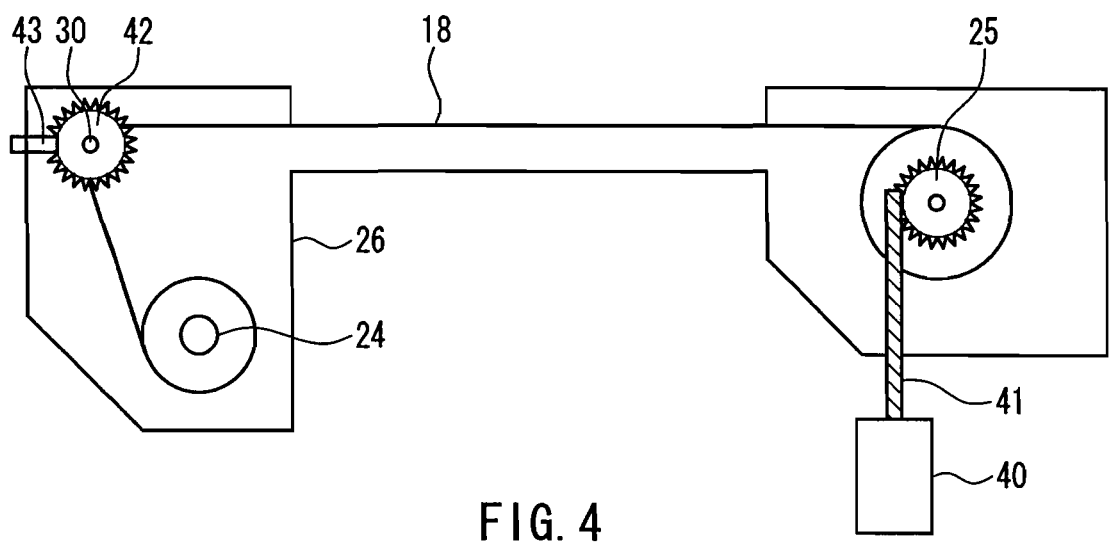
FIG. 4 is a schematic cross-sectional view showing another configuration of the filter unit of the projection-type display apparatus.

The filter speed detector also can be configured as shown in FIG. 4. FIG. 4 is a diagram showing a schematic configuration of a detachable filter unit. Basically, this filter unit is configured similarly to that shown in FIG. 2. That is, the filter take-up shaft 25 is driven by transferring a driving force at a constant speed generated by the take-up motor 40 to the filer take-up shaft 25 through a driving shaft 41. The filter following shaft 30 against which the filter is pressed is placed on the take-up path on which the filter 18 is drawn from the filter feeding shaft 24.

In place of the rotation detection reflective patterns 37 used in the configuration of FIG. 3, a gear 42 is attached to the filter following shaft 30 and it rotates as the filter 18 is taken up. The photosensor 43 is placed to face the gear 42 to form a photointerrupter and detects crests and troughs of the gear 42. That is, in accordance with rotation of the gear 42, the photosensor 43 outputs a High or Low pulse signal depending on crests or troughs of the gear 42 and supplies the signal to the control circuit unit 23.

In the filter unit having the configuration as shown in FIG. 2 or 4, the roll diameter of the filter 18 wound around the filter take-up shaft 25 changes as the amount of the filter 18 taken up by the filter take-up shaft 25 changes. Thus, when the filter take-up shaft 25 is rotated at a constant rate of rotation, the speed at which the filter 18 is taken up changes in accordance with the roll diameter.

Figure 5A:
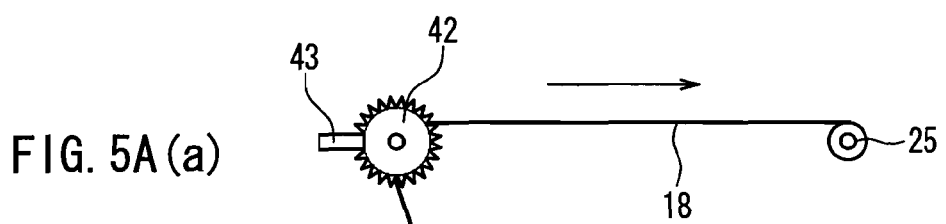
FIG. 5A is a plan view showing changes in roll diameter of a filter at a filter feeding shaft and a filter take-up shaft caused by taking up the filter.
Figure 5A:
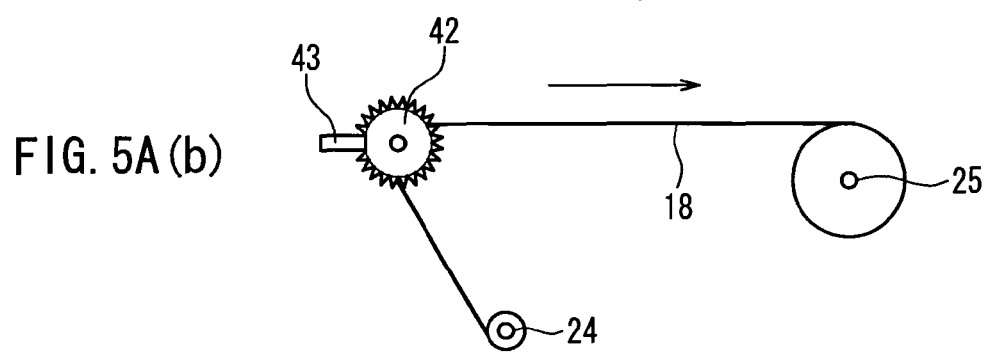
Figure 5B:
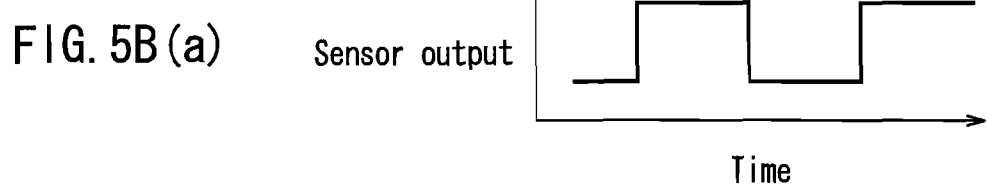
FIG. 5B is a waveform diagram showing changes, caused by taking up the filter, in pulse width of a signal detected by a photosensor.
Figure 5B:
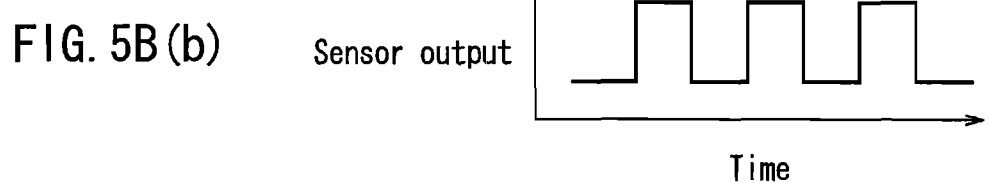

FIGS. 5A and 5B conceptually show the relationship between the speed at which the filter 18 is taken up and the detection pulse signal outputted by the photosensor 43. FIG. 5A shows changes in the roll diameter of the filter 18 at the filter feeding shaft 24 and the filter take-up shaft 25 caused by taking up the filter 18. (a) shows a state at the beginning of the take-up and (b) shows a state near the end of the take-up. FIG. 5B shows changes, caused by taking up the filter 18, in width of a pulse signal (detection pulse width) detected by the photosensor 43. (a) corresponds to the state at the beginning of the take-up shown in FIG. 5A(a) and (b) corresponds to the state near the end of the take-up in FIG. 5A(b).

As can be seen from these drawings, since the filter take-up shaft 25 rotates at a constant speed, the detection pulse width is smaller near the end of the take-up than at the beginning of the take-up. Thus, the relationship between the detection pulse width and the amount of the filter 18 being taken up is determined uniquely, and by preparing a (pulse width)/(used amount) table where the pulse width and the amount taken up are correlated with each other in advance, the used amount of the filter 18 can be known immediately from the detection pulse width.

FIG. 6 shows an example of such a (pulse width)/(used amount) table. The table is created by calculating in advance the used amount of the filter 18 corresponding to the detection pulse width. The drive of the take-up motor 40 of the filter 18 and displaying of the used amount are controlled by a filter control system provided in the control circuit unit 23 shown in FIG. 1, and the control is carried out on the basis of a detection pulse from the photosensor 43 and the (pulse width)/(used amount) table.

In the projection-type display apparatus configured as above, when dust is accumulated on the filter 18 due to long hours of operation, a renewing operation for renewing the soiled part of the filter 18 positioned at the opening 27 with an unused part is carried out to resolve the situation where ventilation is blocked. As a predetermined condition for carrying out the renewal, the cumulative operating time of the filter unit 17 measured by a timer, the state of clogging of the filter detected by an air volume sensor, or the like is applied.

The renewal operation is carried out by rotating the filter take-up shaft 25 in the arrow direction in FIG. 2. Due to this operation, the part of the filter 18 positioned at the opening 27 and on which dust is accumulated is transferred to the filter take-up shaft 25 and an unused part of the filter 18 comes to the position facing the opening 27.

By repeating such a renewal operation, the remaining amount of the filter 18 at the filter feeding shaft 24 decreases. The filter 18 needs replacing when the filter 18 is no longer able to be transferred to the filter take-up shaft 25. To replace the filter 18, it is necessary to notify an indication of the timing to replace the filter 18 based on the used amount or remaining amount of the filter 18. As described above, according to the present embodiment, the used amount of the filter 18 can be measured with high precision based on the pulse width obtained by using the rotation detection patterns composed of the rotation detection reflective patterns 37, the gear 42, etc. and the pattern sensor composed of the photosensor 43, etc. Consequently, it is possible to confirm the timing to replace the filter 18 precisely.

Figure 7:
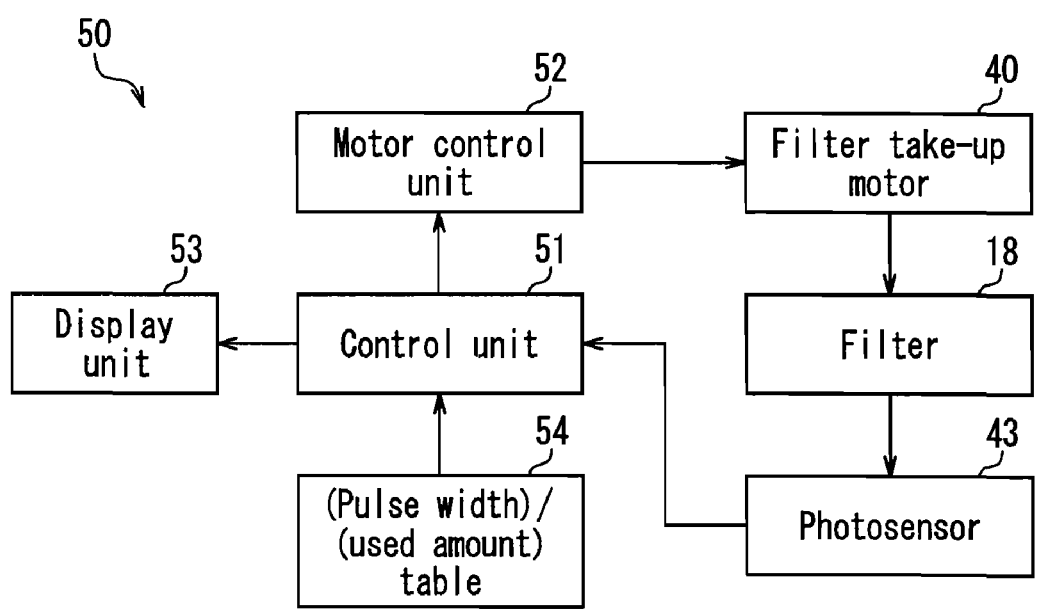
FIG. 7 is a block diagram showing a configuration of a control system of the filter feeding mechanism.
Figure 8:
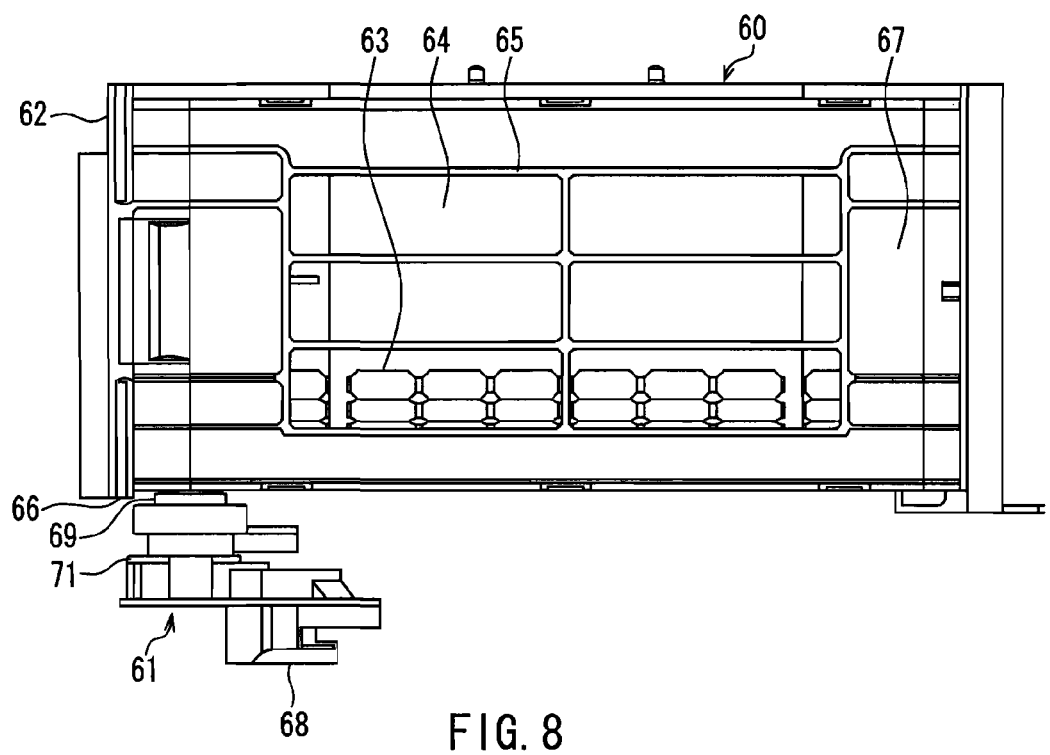
FIG. 8 is a front view showing a basic configuration of a conventional filter unit.
Figure 9:
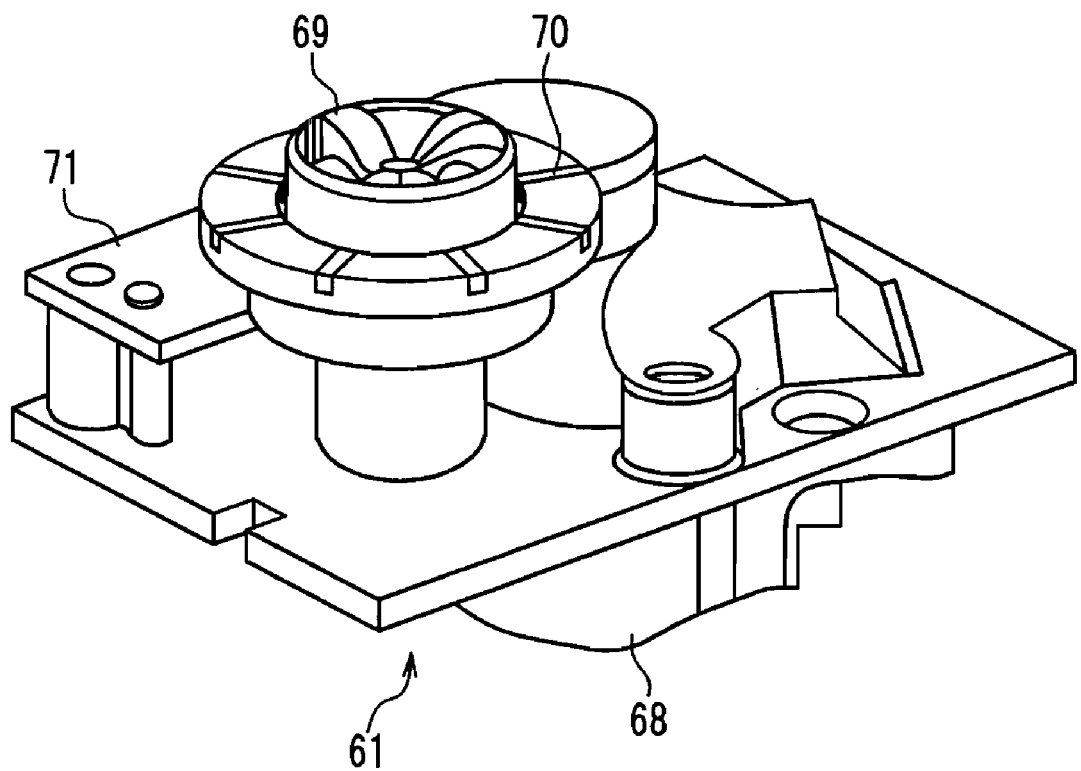
FIG. 9 is a perspective view showing a gear base of the filter unit.

Next, the configuration of the filter control system of the projection-type display apparatus will be described in detail with reference to FIG. 7. FIG. 7 is a block diagram showing a configuration of a filter control system 50 for controlling the filter unit having the configuration shown in FIG. 4. The filter control system 50 is configured such that a control unit 51 controls the operations of a motor control unit 52 and a display unit 53 using a detection signal from the photosensor 43 and the pulse width/used amount table 54.

The motor control unit 52 controls the drive of the filter take-up motor 40 in accordance with an instruction from the control unit 51. The display unit 53 displays, for example, the used amount of the filter 18 based on a signal from the control unit 51. As described above, the (pulse width)/(used amount) table 54 includes data indicating the relationship between the pulse signal detected by the photosensor 43 in response to rotation of the gear 42 and the used amount of the filter 18.

When the control unit 51 requests the motor control unit 52 to take up the filter 18, the motor control unit 53 drives the filter take-up motor 40 at a constant rotation speed. Due to the filter take-up motor 40 being rotated, the filter 18 is taken up by the filter take-up shaft at a constant rotation speed. Along with this, the photosensor 43 detects rotation of the gear 8 positioned on the take-up path of the filter 18, converts the take-up speed of the filter 18 to a pulse signal and transmits the signal to the control unit 51.

The control unit 51 detects the used amount of the filter 18 correlated with the pulse width in advance by using the detection pulse width and the (pulse width)/(used amount) table 54. The detected used amount is displayed to a user through the display unit 53.

In the filter unit having the above-described configuration, the detection pulse width outputted by the photosensor 43 has a one-to-one correspondence with the roll diameter of the filter 18 at the filter take-up shaft 25, in other words, with the used amount of the filter 18. Thus, the used amount of the filter can be known immediately from the detection signal of the photosensor 43, so that there is no need to detect the transferred amount of the filter every time the filter is taken up and calculate the sum. Therefore, it is possible to avoid a loss in precision of calculating the used amount of the filter due to the accumulation of differences in measuring the transferred amount of the filter. As a result, the used amount of the filter can be detected precisely and the timing to replace the filter in particular can be known precisely.

The invention may be embodied in other forms without departing from the spirit of essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A filter unit comprising:
   a feeding shaft around which an unused part of a roll filter is wound;
   a take-up shaft for taking up the filter from the feeding shaft;
   a motor for rotating and driving the take-up shaft so as to take up the filter;
   a filter unit housing for housing the feeding shaft and the take-up shaft and including, between the both shafts, an opening for exposing the filter;
   rotation detection patterns that rotate in connection with transfer of the filter caused by taking up the filter and are placed at predetermined intervals in a circumferential direction in which the rotation detection patterns rotate;
   a pattern sensor for detecting rotation of the rotation detection patterns and outputting a detection signal whose amplitude fluctuates in accordance with the predetermined intervals; and
   a used amount detecting unit for detecting a used amount of the filter based on a correspondence between a period at which the amplitude of the detection signal fluctuates and an amount of the filter taken up by the take-up shaft.

2. The filter unit according to claim 1, wherein the rotation detection patterns are defined by a gear and the pattern sensor is composed of a photosensor for detecting projections and depressions of the gear.

3. The filter unit according to claim 1, wherein the used filter amount detecting unit includes a table providing a correlation between the detection signal outputted by the pattern sensor and the used amount of the filter, and the used filter amount detecting unit detects, by using data in the table, the used amount of the filter based on the detection signal outputted from the pattern sensor as the rotation detection patterns rotate.

4. A projection-type display apparatus comprising:
   a light source unit;
   an image forming unit for forming an image by modulating light from the light source unit;
   a projection optical system for magnifying and projecting the formed image;
   a housing for housing the light source unit, the image forming unit and the projection optical system;
   an air intake and an exhaust provided on the housing;
   a blower unit for taking in or exhausting air through the air intake and the exhaust; and
   the filter unit according to claim 1 placed at the air intake.

\* \* \* \* \*